US011274066B1

(12) United States Patent
Goodman et al.

(10) Patent No.: US 11,274,066 B1
(45) Date of Patent: Mar. 15, 2022

(54) CERAMIC ARMOR AND OTHER STRUCTURES MANUFACTURED USING CERAMIC NANO-PASTES

(71) Applicants: Goodman Technologies LLC, Albuquerque, NM (US); University of Hawai'i, Honolulu, HI (US)

(72) Inventors: William A. Goodman, Albuquerque, NM (US); Mohammad Naghi Ghasemi-Nejhad, Honolulu, HI (US); Brenden Masao Minei, Honolulu, HI (US)

(73) Assignees: Goodman Technologies LLC, Albuquerque, NM (US); University of Hawai'i, Honolulu, HI (US)

( * ) Notice: Subject to any disclaimer, the term of this patent is extended or adjusted under 35 U.S.C. 154(b) by 173 days.

(21) Appl. No.: 16/203,917

(22) Filed: Nov. 29, 2018

Related U.S. Application Data

(60) Provisional application No. 62/592,705, filed on Nov. 30, 2017.

(51) Int. Cl.
  *C04B 35/587* (2006.01)
  *C04B 35/117* (2006.01)
  (Continued)

(52) U.S. Cl.
  CPC .......... *C04B 35/587* (2013.01); *C04B 35/117* (2013.01); *C04B 35/563* (2013.01);
  (Continued)

(58) Field of Classification Search
  CPC ... C04B 35/587; C04B 35/117; C04B 35/563; C04B 35/565; C04B 35/634
  See application file for complete search history.

(56) References Cited

U.S. PATENT DOCUMENTS 5,071,596 A    12/1991   Goela et al.
5,439,627 A *   8/1995   De Jager ............... B22F 1/0059
                                                               264/129
(Continued)

FOREIGN PATENT DOCUMENTS

WO         9616000       5/1996

OTHER PUBLICATIONS

Ahmad, I., et al., "Microwave-Assisted Pyrolysis of SiC and its Application to Joining", American Ceramic Society, Cincinnati, OH., May 1-3, 1995, 1995.
(Continued)

*Primary Examiner* — Alex B Efta
(74) *Attorney, Agent, or Firm* — Peacock Law P.C.; Philip D. Askenazy

(57) ABSTRACT

A method of making a ceramic matrix composite (CMC) part such as armor, in which a mixture, including a preceramic polymer, particles such as ceramic microparticles and/or nanoparticles, and organic compounds such as a surfactant and a solvent, are mixed to form a paste and printed or molded. The part is then cured and densified by polymer infiltration and pyrolysis (PIP) using the preceramic polymer with a varying amount and size of ceramic particles and different temperatures in some of the cycles. The CMC can contain silicon carbide, boron carbide, boron suboxide, alumina, or any other ceramic. The process is compatible with sacrificial materials, enabling the creation of parts with hollow portions or overhangs. The mixture preferably has a high loading of particles, for example between 70 wt % and 90 wt % of the mixture, in order to minimize shrinkage. Curing and pyrolyzing the part can be performed by microwaving. Two such CMC parts can be joined together by using the paste, having the same or a different concentration of particles, as an adhesive.

40 Claims, 15 Drawing Sheets

(51) Int. Cl.
*C04B 35/563* (2006.01)
*C04B 35/626* (2006.01)
*C04B 35/634* (2006.01)
*C04B 35/565* (2006.01)
*F41H 5/04* (2006.01)

(52) U.S. Cl.
CPC ........ *C04B 35/565* (2013.01); *C04B 35/6267* (2013.01); *C04B 35/634* (2013.01); *F41H 5/0435* (2013.01); *C04B 2235/5418* (2013.01); *C04B 2235/667* (2013.01)

(56) References Cited

U.S. PATENT DOCUMENTS

| | | | |
|---|---|---|---|
| 5,441,762 A * | 8/1995 | Gray | C04B 41/52 427/190 |
| 5,635,250 A * | 6/1997 | Blum | C04B 35/14 427/228 |
| 5,853,653 A | 12/1998 | Donato et al. | |
| 6,479,583 B2 * | 11/2002 | Halloran | C08G 77/06 516/55 |
| 6,627,019 B2 * | 9/2003 | Jarmon | C04B 35/573 156/89.11 |
| 7,888,277 B2 | 2/2011 | Riedell et al. | |
| 8,016,970 B2 * | 9/2011 | Dull | B29C 70/342 156/249 |
| 8,337,648 B2 | 12/2012 | Mako et al. | |
| 8,859,037 B2 | 10/2014 | Stout et al. | |
| 9,132,619 B2 * | 9/2015 | Khalifa | B32B 37/16 |
| 9,943,979 B2 | 4/2018 | Findley | |
| 9,944,021 B2 | 4/2018 | Easter et al. | |
| 9,944,564 B2 | 4/2018 | Amini et al. | |
| 10,730,203 B2 * | 8/2020 | Goodman | C04B 35/515 |
| 2002/0195744 A1 * | 12/2002 | Otsuki | B29C 33/68 264/272.17 |
| 2003/0137084 A1 | 7/2003 | Kohyama et al. | |
| 2006/0141154 A1 * | 6/2006 | Thebault | C04B 41/009 427/249.2 |
| 2007/0138706 A1 | 6/2007 | Metzger et al. | |
| 2007/0140065 A1 | 6/2007 | Levingston | |
| 2011/0221084 A1 | 9/2011 | Goodman et al. | |
| 2016/0159698 A1 * | 6/2016 | Landwehr | C04B 35/806 501/88 |
| 2016/0207783 A1 * | 7/2016 | Hopkins | C04B 35/806 |
| 2017/0029339 A1 * | 2/2017 | Weaver | C04B 35/80 |
| 2017/0233300 A1 | 8/2017 | Raj | |
| 2017/0313627 A1 * | 11/2017 | Shim | C04B 35/6264 |
| 2017/0369380 A1 | 12/2017 | Smyth et al. | |
| 2018/0148588 A1 | 5/2018 | Schmidt et al. | |
| 2019/0160704 A1 | 5/2019 | Goodman et al. | |

OTHER PUBLICATIONS

Danko, Gene A., et al., "Comparison of Microwave Hybrid and Conventional Heating of Preceramic Polymers to Form Silicon Carbide and Silicon Oxycarbide Ceramics", J. Am. Ceram. Soc., vol. 83, No. 7, 2000, 1617-1625.

Reed, James S., "Principles of Ceramics Processing, 2nd Edition", 1995, 265-272.

\* cited by examiner

CERAMIC ARMOR AND OTHER STRUCTURES MANUFACTURED USING CERAMIC NANO-PASTES

CROSS-REFERENCE TO RELATED APPLICATIONS

This application claims priority to and the benefit of the filing of U.S. Provisional Patent Application No. 62/592,705, entitled "Ceramic Structures/Armors and Methods for Making Same Employing Ceramic Nano-Paste", filed on Nov. 30, 2017, the specification and claims of which are incorporated herein by reference.

FEDERALLY SPONSORED RESEARCH OR DEVELOPMENT

This invention was made with government support under W911NF-17-P-0062 and W911NF-18-C-0101 awarded by the U.S. Army Research Office. The government has certain rights in the invention.

BACKGROUND OF THE INVENTION

Field of the Invention (Technical Field)

The present invention is related to ceramic articles such as armor and methods for making same, especially via in-theater additive manufacturing for dismounted soldiers and structures.

Background Art

Note that the following discussion refers to a number of publications and references. Discussion of such publications herein is given for more complete background of the scientific principles and is not to be construed as an admission that such publications are prior art for patentability determination purposes.

BRIEF SUMMARY OF THE INVENTION

An embodiment of the present invention is a method for manufacturing a ceramic matrix composite (CMC) part, the method comprising providing a mixture comprising at least one preceramic polymer, particles, an optional first organic compound, and an optional second organic compound; removing the first organic compound from the mixture; printing or molding the mixture to form a shape of a CMC part; infiltrating the cured part with the preceramic polymer comprising a first weight percentage of particles; and pyrolyzing the CMC part at a first temperature. The preceramic polymer is preferably a precursor to silicon carbide, boron carbide, boron suboxide, alumina, silicon nitride, or boron nitride. The CMC part optionally comprises armor, a helmet, a protective plate, or a portion thereof. The method preferably further comprises removing the second organic compound, preferably by processing the printed or molded mixture in a vacuum furnace, and then curing the mixture. Removing the first organic compound preferably comprises processing the mixture in a vacuum chamber. Printing or molding the mixture optionally comprises placing a sacrificial material in the printed or molded mixture, and then preferably removing the sacrificial material so that the CMC part comprises internal voids or channels after the second pyrolyzing step. The particles preferably comprise between approximately 70 wt % and approximately 90 wt % of the mixture. Printing or molding the mixture preferably comprises applying pressure and/or compaction to the mixture. The method preferably comprises curing the mixture. Curing the mixture and/or pyrolyzing the part optionally comprises microwaving the mixture or part. The curing step is optionally partially or completely performed during the printing or molding step. A difference between the size of the CMC part after the final pyrolysis step and a size of the part prior to curing is preferably less than approximately 5%. More preferably the size of the CMC part after the final pyrolysis step is the same as the size of the part prior to curing.

The particles optionally comprise a mixture of microparticles and nanoparticles. The microparticles are preferably between approximately 1 micron and approximately 1000 microns in size, more preferably between approximately 1 micron and approximately 5 microns in size, while the nanoparticles are preferably between approximately 10 nm and 1000 nm in size, and more preferably between approximately 45 nm and approximately 55 nm in size. The first organic compound and the second organic compound are preferably liquids with different vapor pressures. The first organic compound preferably comprises a surfactant and the second organic compound comprises a solvent. The surfactant preferably comprises a non-ionic polyether modified trisiloxane and the solvent preferably comprises toluene. In the infiltrating steps the preceramic polymer optionally comprises the first organic compound. The method optionally further comprises disposing a layer of the mixture on a surface of the CMC part. Printing or molding the mixture preferably comprises coating one or more walls of a mold with a polyimide film prior to disposing the mixture in the mold. One or more of the pyrolyzing steps optionally comprises placing one or more caul plates on the CMC part to prevent bowing. The particles preferably comprise silicon carbide, boron carbide, boron suboxide, alumina, silicon nitride, boron nitride, or a combination thereof. In the infiltrating step the first weight percentage of particles is optionally zero. The method preferably comprises infiltrating the CMC part with the preceramic polymer comprising a second weight percentage of particles after the pyrolyzing step; and pyrolyzing the CMC part at a second temperature. The second temperature can be the same, higher, or lower than the first temperature. The second weight percentage of particles can be the same, higher or lower than the first weight percentage of particles.

An embodiment of the present invention is a method of joining two CMC parts together, each CMC part manufactured by the method described above, the method comprising applying a material to at first surface of a first CMC part, and joining a second surface of a second CMC part to the first surface. The material is preferably selected from the group consisting of the mixture, the mixture comprising the particles but not comprising one or both of the organic compounds, the preceramic polymer, and the preceramic polymer comprising a lesser weight percent of particles than a weight percent of particles in the mixture. The method optionally comprises applying the material to the second surface prior to the joining step. The method preferably comprises curing the joined CMC parts and the material. The method preferably further comprising pyrolyzing the joined CMC parts.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating certain embodiments of the invention and are not to be construed as limiting the invention. In the figures.

DETAILED DESCRIPTION OF EMBODIMENTS OF THE INVENTION

Figure 1:
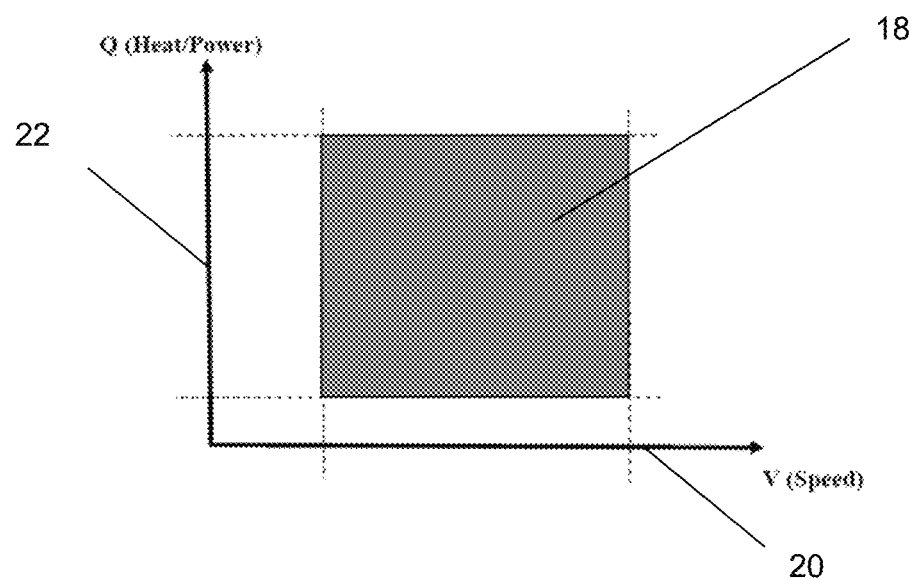
FIG. 1 is a schematic of a processing window for cure-on-the-fly 3D printing of nano-pastes of the present invention, showing lower and upper bounds for the 3D printer speed (V) and the heat input (Q) of the IR heaters to produce good quality parts.

In one or more embodiments of the present invention, the present invention is of ceramic articles such as armor and methods for making same via 3D printing of alumina ($Al_2O_3$), boron carbide ($B_4C$), and silicon carbide (SiC) advanced ceramic materials. 3D parts can be printed using a multiple-head delivery system with a delivery rate of 52 g/s per head and proprietary particulate pastes, an improvement over traditional manufacturing which involves specialty tooling, large upfront costs, and long lead times. One embodiment provides an in-theater solution for future dismounted persons to additively manufacture customized body armor plate replacements, modular scalable vests, ceramic helmets, and protective structures.

In some embodiments, infrared heating and high-power microwave was used to cure and ceramitize printed and molded nano-pastes, or pastes comprising a preceramic polymer and particles such as micro- and/or nano-particles. Further development of novel nano-pastes of SiC and BaC and using preceramic polymer for boron carbide ceramic could include: 100% BaC (boron carbide), boron carbide with additions of $B_6O$ (boron suboxide), boron carbide with additions of $AlB_{12}$, and hybrid 50 wt % $B_4C$-50 wt % SiC. Combinations of other nanoparticles and nanomaterials such as $Y_2O_3$ as well as carbon nanotubes and graphene nanosheets for their high thermal conductivities can expedite internal curing and ceramitization. Addition of high-grade SiC whiskers can be used for further strengthening and toughening.

High theoretical densities in pressureless sintering of SiC and BaC ceramic armor plates are preferably obtained for smaller particulate sizes, and common particulate sizes for sintered armor are typically in the range of 1-10 microns. The SiC:$B_4C$ mass ratio does not seem to greatly affect V50 for 7.62 mm armor piercing rounds, potentially allowing application-specific cost/weight balances at constant protection level. $B_4C$ particle size distribution had a strong effect on V50. For SiC:$B_4C$ with BaC features ranging from 1 μm to 100 μm diameter, the larger and coarser features performed better. Using coarse BaC particles in a SiC matrix, a V50 of approximately 980±20 m s$^{-1}$ at a density of 3.00 g/cc was achieved reproducibly. This material is preferred due to a combination of relatively lower cost, reduced density and repeatability.

The process of 3D printing via particulate pastes or ceramic slurries can be used in the present invention. Software is preferably used to partition a STL file (stereolithography file format) into layers of thickness approximating that of the extrusion nozzle diameter. A preferably continuous filament of particulate paste is extruded in the shape required to fill the first layer, for example a rectangular block. The stage is subsequently moved down (or the nozzle is moved up) and the next layer is deposited in the required pattern. This is repeated until the 3D part is complete. Numerically controlled mechanisms can be used to move the nozzle in a calculated tool path generated by a computer-aided manufacturing (CAM) software package. Stepper motors or servo motors can be employed to move the nozzle with precision as fine as nanometers. In one embodiment, a random tool path can be created to mitigate anisotropic material properties caused by a regular and linear raster tool path, thus addressing one of the concerns with 3D printing.

Parallel processing, preferably by expanding the build platform and adding more deposition heads to a machine which is already moving in a programmed pattern, can be used to print multiple parts, greatly reducing production costs and increasing throughput with minimal equipment investment. In one embodiment, up to three machines building 5-20 parts in parallel per machine can be used. In general, parts built with this process can range from 10 to 150 mm. An exemplar CNC router table can be retrofitted to create a large 3D printing machine with the capacity to dispense 2.0 L of particulate paste material and to build parts up to 250 mm. This unit can be scaled up to build multiple enhanced small arms protective insert (ESAPI) plates in parallel, or a single large part such as an armor plate for a structure or a vehicle.

Ceramic slurries useful for the present invention preferably comprise more solid than liquid, but still exhibit a fluid or paste like consistency and flow. A high solid content, up to 85% ceramic powder, minimizes the amount of drying and shrinkage. The right slurry properties are essential for rapid drying of the material. Within 10 to 15 seconds of being deposited, the slurry must dry from a fluid-like state into a solid-like state so that the next layer can be added. If the slurry is too liquid, the deposits will come out as liquid beads that spread uncontrollably. If it is too thick, deposits are like rope. With the proper consistency, each deposited bead can be a rectangular cross section with relatively straight walls and flattened tops. After the part is formed by layering and dries, it is preferably baked in a furnace at very high temperatures so that the particles can "densify," a process called sintering. Sintering temperatures can range from 1,000-1,700 degrees C. for two hours, depending on the specific ceramic being sintered.

Unlike more traditional methods of metals and ceramic fabrication, this deposition method has the advantage of being able to deposit more than one material at a time. Materials can thus be graded, for example transitioning from a ceramic material to a metal within one part without causing structural damage. This feature may have tremendous value for directly forming attachments in armor, allowing armor plates to be conventionally bolted to structures or vehicles. As another example, both boron carbide and silicon carbide can be co-deposited, thus providing the creation of specific cost/weight balances at constant protection level (V50). Another feature of this technique is that it enables discrete placement of a material that is intended to evaporate or burn away during the baking process. This is useful for creating a part that, for example, comprises internal channels. The channels could be filled with viscoelastic dampening material, for example, providing damping upon projectile impact.

In one or more embodiments, the materials have a broad range of applications including high toughness ceramic body armor, ceramic armor for vehicles, ceramic armor for structures in-theater, ceramic helmets, nuclear grade ceramics, accident tolerant fuel rods, and structures for high energy particle physics. 3D printed ceramics can also have utility in high temperature applications, hypersonics, and future space structures. Additive manufacturing provides an enabling capability for producing custom and short run production items at significantly lower costs than traditional manufacturing due to elimination of tooling and other high-end capital equipment.

In one embodiment, improved high-density alumina particulate pastes are provided. Water and other additives can be employed to make a quick drying alumina paste that deposits as a greenbody (like a chalky clay), which is then subsequently sintered to a ceramic. Particulate size, distribution, viscosity, rheology, drying and shrinkage are all key aspects of the particulate paste development. One can employ submicron and nanoparticulate additions to 1500-2500 mesh particulates in order to achieve high density sintered armor plates.

In one embodiment, the particulate pastes can be employed in a multi-head machine that exceeds a deposition rate of 30 g/s. Using alumina slurries and particulate pastes, one embodiment employs "fill patterns". For square plates, both length fill and width fill are approximately equal length tool paths, but 90 degrees apart. Crosshatching, i.e., alternating layers of length and width fill is another possible tool path. Much like continuous fiber composites, a quasi-isotropic fill pattern can be fashioned by layering length, width and shear directions (±45 degrees).

While being extruded or 3D printed, nano-pastes of the present invention can be cured-on-the-fly by using infrared local and global heaters so that the curing and shrinking happens locally to minimize the processing temperature gradients in the part, minimize the global shrinkage and geometric constraints, and in turn, minimize the residual stresses, which will minimize the shrinkage, warpage, and cracking. In addition, the process can eliminate the post-curing stage after 3D printing because the pre-ceramic based ceramics processing and the parts can directly go to the polymer infiltration and pyrolysis stage, as described below.

According to FIG. 1, during a cure-on-the-fly process, processing window 18 can be established based on the level of the 3D printing speed (V) 20 and local IR heaters' heat (Q) 22, to obtain an acceptable level of cure for the cure-on-the-fly 3D printing of the nano-paste. These levels of V 20 and Q 22 should be established such that the process gives nano-paste enough time and temperature for curing and holding its shape and size as it is being laid down. To establish the processing window, minimum (lower bound) and maximum (upper bound) levels of V 20 and Q 22 should be established within which nano-paste has enough time and temperature to cure as it is being laid down. Then, the area within processing window 18 gives the processing parameters for V 20 and Q 22 so that if the operation of the cure-on-the-fly 3D printing process stays within the processing window, the printed part will have good quality, i.e., it will be cured with minimum shrinkage and cracks. FIG. 1 shows processing window 18 lower and upper bounds of V 20 and Q 22 schematically, indicated by the dotted lines. The larger the processing window, the easier it is to control the processing for the manufacturing of the parts to ensure they are within the acceptable levels of the desired qualities. It is preferable that the manufacturer avoids staying close to the boundaries of processing window 18 during processing. A similar processing window, optionally including heater power and part thickness parameters, can be used for any curing or pyrolyzing step.

EXAMPLES

The invention is further illustrated by the following non-limiting examples. These examples can be repeated with similar success by substituting the generically or specifically described reactants and/or operating conditions of this invention for those used in the examples. Some of these examples preferably employ a silicon carbide matrix precursor paste, StarPCS™ SMP-10, manufactured by Starfire Systems, with the inclusion of micron and nano-sized SiC particles to create a ceramic nano-paste that can be 3D printed to manufacture SAPI and/or ESAPI plates, preferably with the dimension of 90 mm square with 8 mm thickness, using a mold size of about 3% larger to allow for shrinkage. In other embodiments preceramic polymers other than SMP-10 or a hybrid of various preceramic polymers can be employed to yield similar nano-pastes. In addition, surfactants or solvents, other than those mentioned here, can be used depending on their compatibility with the preceramic polymer(s) used.

Furthermore, in addition to the micro- and nano-particles mentioned in these examples, other nanomaterials or combinations thereof, such as ceramics like boron carbide ($B_4C$) or oxides like yttrium oxide or yttria ($Y_2O_3$) nanoparticles, magneto-restrictive, electro-restrictive, or piezoelectric nanofibers, carbon nanotubes, graphene nanosheets, or even silicon carbide (SiC) short/whisker fibers can be used within the paste during the sonication and mixing steps to produce the desired nano-paste, depending on the applications for passive and active structures as well as the mixing and printing conditions. Any size particles, or a mixture of sizes, may be used. As used throughout the specification and claims, the term "particle" means particle, microparticle, nanoparticle, fiber, chopped fiber, discontinuous fiber, microfiber, nanofiber, whisker, nanosheet, nanotube, and the like.

Figure 2:
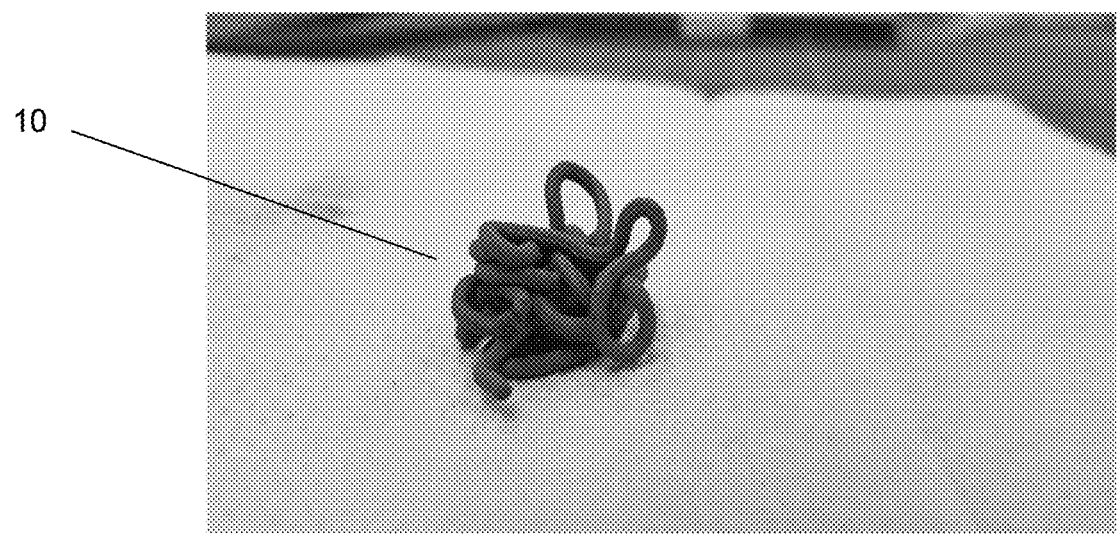
FIG. 2 is a photograph of a the ceramic nano-paste of Example 1.

Example 1: Making the Ceramic "Nano-Paste" Mix with SMP-10 and the Maximum Amount of Micro- and Nano-Sized SiC Particles with Extruding and 3D Printing Capabilities The first step in mixing is to combine required amounts of SMP-10, Toluene, and Surf-240 (Evonik BREAK-THRU® S-240 surfactant, a non-ionic polyether modified trisiloxane), and bath sonicate the mix for 5 minutes. Next, the 45-55 nm spec (nominally 50 nm average) SiC particles should be added slowly while mixing. The 3 micron SiC is added last, at this stage more Surf-240 can be added to insure a homogeneous mixture. Table 1 gives the final amount of ingredients in the Mix to maximize the SiC particle inclusions into SMP-10 while making ceramic nano-paste 10 as shown in FIG. 2.

TABLE 1

| Material | Weight (g) |
| --- | --- |
| SMP-10 | 35 |
| Toluene | 10 |
| Surf-240 | 30 |
| 45-55 nm SiC Nanoparticles | 25 |
| 1-5 micron SiC Microparticles | 65 |

Figure 3:
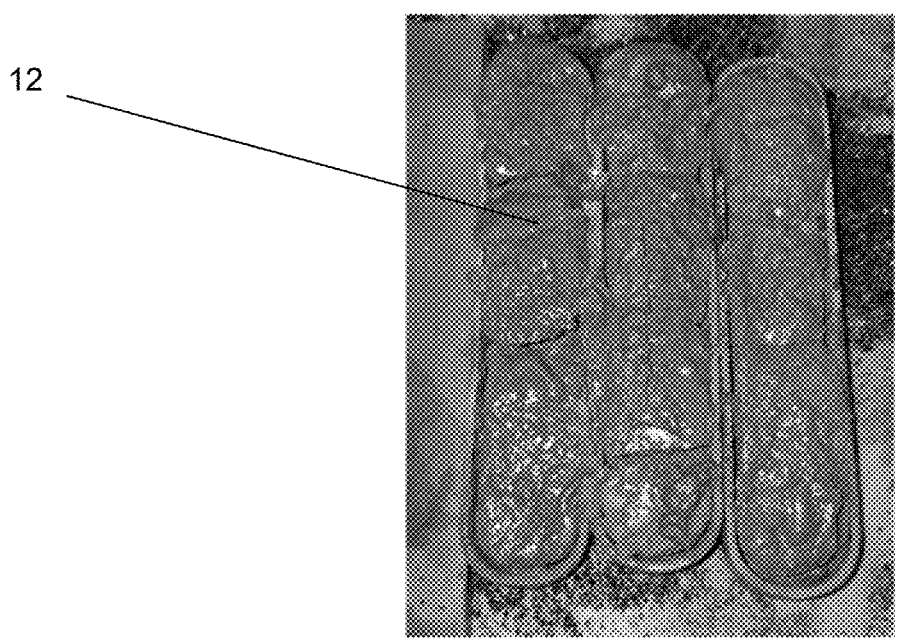
FIG. 3 shows cured and pyrolyzed parts manufactured in accordance with Example 1.
Figure 4:
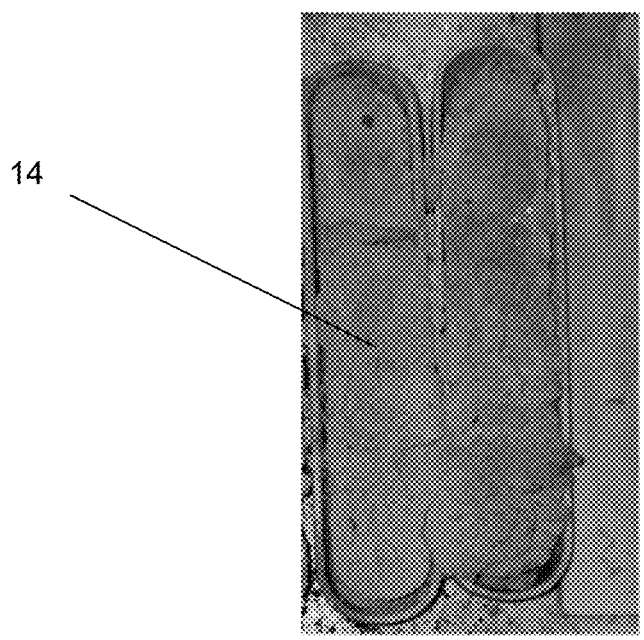
FIG. 4 shows cured and pyrolyzed parts of Example 1 but with the toluene removed.

The amounts in Table 1 can be modified depending on the mixing and printing conditions. The Surf-240 is preferably removed after the mixing of all of the ingredients, preferably by placing the mixture in a vacuum chamber with a vacuum of approximately 25 inches of mercury (25 inHg), at room temperature, for 25 minutes or as long as it takes for the Surf-240 to evaporate, as determined by weighing the mixture. The mix then looked and behaved like a paste, as shown in FIG. 2. The paste mixture was cured at 190-200 degrees C. and subsequently pyrolyzed at 600 degrees, resulting in the material shown in FIG. 3. Even though the Surf-240 is entirely removed, toluene is still present in the material, resulting in cracking upon cure and pyrolysis. It is believed that the cracking is caused by the reduction in volume during the curing process as the toluene surfactant evaporates. To remedy this problem, after removing Surf-240, as explained above, the paste was molded and the mold was placed inside a vacuum furnace at about 29 inHg vacuum at 70 degrees C. overnight. Weighing the sample showed that the toluene had been removed. When toluene is thus removed the part inside the mold takes on a hard modeling clay-like quality, and is no longer like a paste, meaning that if the mixture of Table 1 is used, 3D printing is preferably performed after Surf-240 is removed but before the toluene is removed. This part, inside the mold, was then cured (at 200 degrees C.) and pyrolyzed (at 600 degrees C.) and the result, cured and pyrolyzed paste 14, is shown in FIG. 4. The total weight after evaporation of Surf-240 and toluene is 35+25+65=125 g. Therefore, the percentage of micro- and nano-sized particles overall is 90/125=72%.

In a variation of this example, the SMP-10 content was decreased from 35 g to 22 g to increase the solid portion of the nano-paste to approximately 80% (90/(22+25+65)) after evaporation. This paste behaved similarly to the composition shown in Table 1, and the rest of the processing conditions were similar.

Example 2: Making the Ceramic "Nano-Paste" Mix with SMP-10 and Micro- and Nano-Sized SiC Particles To create a mixture that even after removing Surf-240 and Toluene is still in paste form and hence is 3D printable, the percentage of SMP-10 was increased, as shown in Table 2.

TABLE 2

| Material | Weight (g) |
| --- | --- |
| SMP-10 | 50 |
| Toluene | 10 |
| Surf-240 | 30 |
| 45-55 nm SiC Nanoparticles | 25 |
| 1-5 micron SiC Microparticles | 65 |

Figure 5:
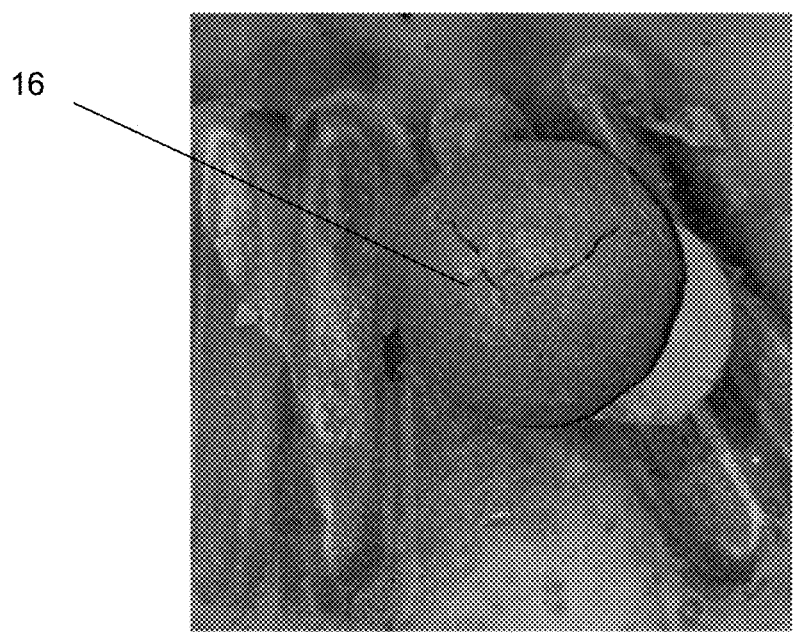
FIG. 5 shows a sphere manufactured in accordance with Example 2.

The amounts in Table 2 can be modified depending on the mixing and printing conditions. Adding more SMP-10 into the mixture makes the mixture a softer moldable material but still remaining in paste form even when both Surf-240 and toluene are removed. The mixture in this example also increases the 3D printing working time compared to Example 1, in which the toluene is preferably kept in the mixture for the mixture to be in the paste form, and hence be 3D printable. However, a long 3D printing process could lead to the evaporation of some of the toluene in time (especially, if heat is used) which will cause the mixture to harden as the toluene surfactant evaporates. The mixture of this example is thus advantageous in that the mixture retains its paste form and moldability and printability even after removing all of the Surf-240 and toluene. FIG. 5 shows 2.5 inch diameter sphere 16 formed from the mixture of this example after removing the Surf-240 and toluene surfactants (thus demonstrating excellent paste-like and moldability characteristics) and after curing at (200 degrees C.) and pyrolysis (600 degrees C.). The crack on sphere 16 can be attributed to the part being hand molded into a ball so that insufficient pressure and compaction were applied to substantially remove all bubbles (unlike FIGS. 2 and 3, where proper molding and compaction were used). As a result, it is believed that when proper molding and compaction are used for the mixture of this example, objects will not have cracks after curing and pyrolysis. In this example, the total weight after evaporating the Surf-240 and toluene is 50+25+65=140 g. Therefore, the percentage of micro- and nano-sized particles overall is 90/140=64%.

Example 3: Making the Ceramic "Nano-Paste" Mix with SMP-10 and the Maximum Amount of Micro- and Nano-Sized SiC Particles In this example the percentage of micro/nanoparticles was increased up to approximately 90%.

TABLE 3

| Material | Weight (g) |
|---|---|
| SMP-10 | 10 |
| Toluene | 10 |
| Surf-240 | 30 |
| 45-55 nm SiC Nan oparticles | 25 |
| 1-5 micron SiC Microparticles | 65 |

The amounts in Table 2 can be modified depending on the mixing and printing conditions. After removal of the Surf-240 as described previously, the paste was molded and then the toluene was removed as described previously. After removal of the toluene the part inside the mold took on a hard modeling clay-like quality, and was no longer like a paste, meaning that 3D printing is preferably performed after Surf-240 is removed but before the toluene is removed. This part, inside the mold, was then cured at 200 degrees C. and pyrolyzed at 600 degrees C.; the result looked similar to that in FIG. 4. The total weight after evaporating the Surf-240 and toluene was 10+25+65=100 g. Therefore, the percentage of micro- and nano-sized particles overall was: 90/100=90%.

Example 4: Microwaving of Ceramic "Nano-Paste"

Figure 6:
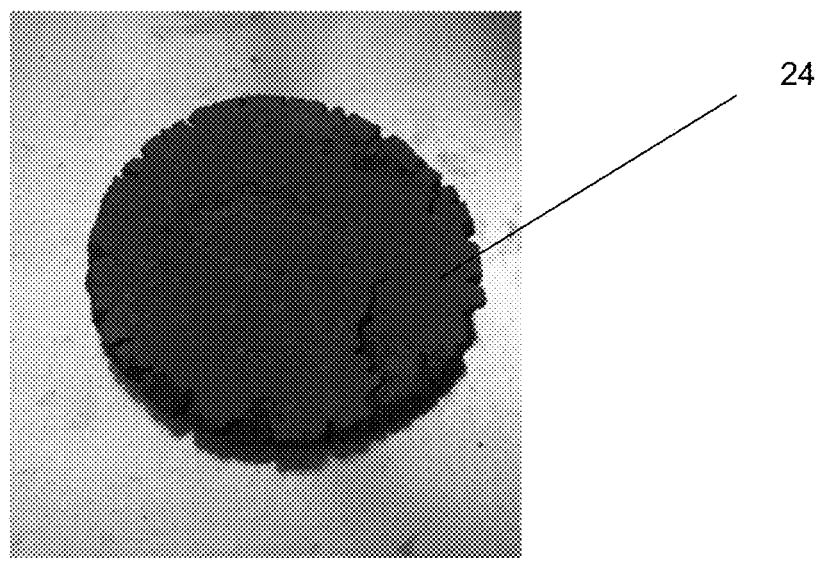
FIG. 6 shows a smooth mirror-like back surface of a microwaved nano-paste part of the present invention.
Figure 7:
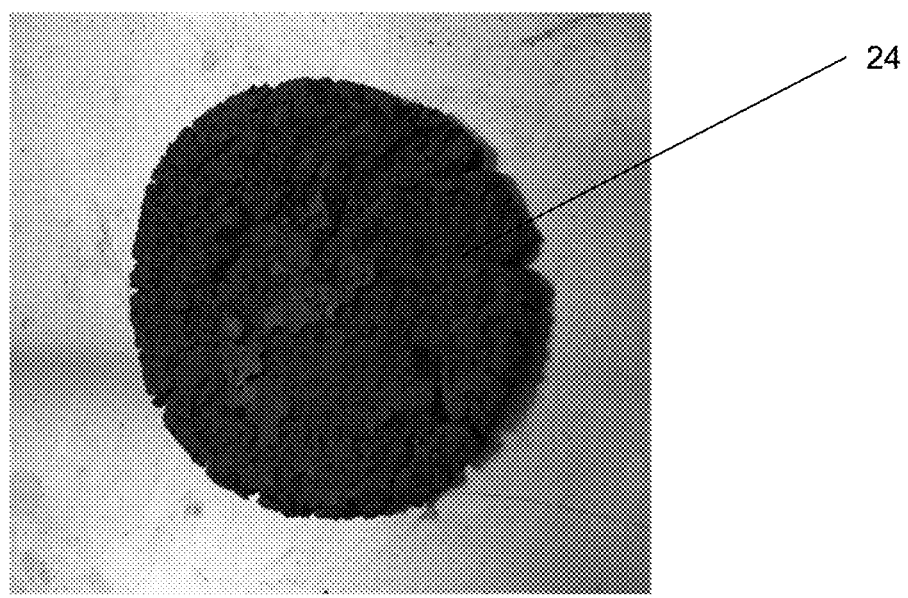
FIG. 7 shows the porous front surface of the part of FIG. 6.

A mirror-like ceramitized surface on a part manufactured from a nano-paste of the present invention was created using high power microwave processed in 30 second intervals. FIG. 6 shows the back side (which was resting on the mandrel/mold) with a smooth, mirror-like surface. FIG. 7 shows the porous front side of part 24 processed in the microwave. Initial lower power microwaving, then subsequent high power microwaving, can release internal gasses to minimize porosity and cracks. A similar result can be achieved by vacuum furnace processing, simulating processing in space.

Example 5—SAPI Plate 1

A SAPI plate was made from the following composition:

TABLE 4

| Material | Weight (g) |
|---|---|
| SMP-10 | 39 |
| Toluene | 10 |
| Surf-240 | 30 |
| 45-55 nm SiC Nanoparticles | 25 |
| 1-5 micron SiC Microparticles | 65 |

Figure 8A:
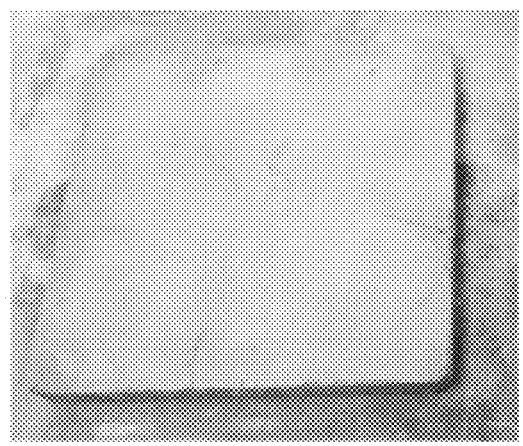
FIGS. 8A-8C show pyrolyzed small arms protective insert (SAPI) plates made from nano-paste particle loadings of 70%, 80%, and 90% respectively.

The nano-paste of this example, which did not comprise Surf-240 (removed after mixing as described above) and toluene (removed after 3D printing as described above), was cured at 190-200° C. and then pyrolyzed at 600° C. FIG. 8A is a photograph of the plate after such pyrolysis. The total weight after evaporating of Surf-240 and toluene was 39+25+65=129 g. Therefore, the percentage of micro- and nano-sized particles overall is: 90/129=70%. The final goal dimensions were 90 mm square with 8 mm in thickness. SAPI plates with initial dimensions of 93 mm square with 9 mm thickness were made to allow for the shrinkage, and employed the nano-polymer infiltration and pyrolysis techniques described herein.

Example 6—SAPI Plate 2

A SAPI plate was made from the following composition:

TABLE 5

| Material | Weight (g) |
|---|---|
| SMP-10 | 22 |
| Toluene | 10 |
| Surf-240 | 30 |
| 45-55 nm SiC Nanoparticles | 25 |
| 1-5 micron SiC Microparticles | 65 |

Figure 8B:
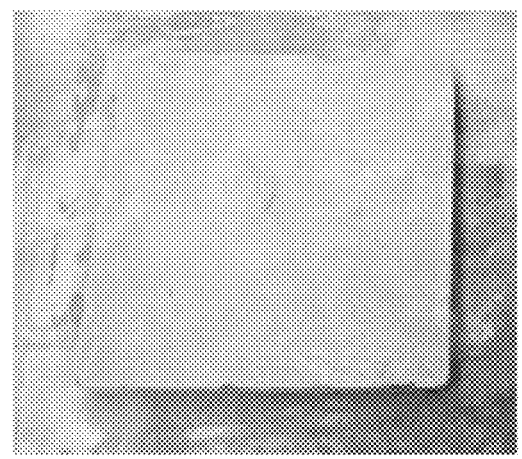

The nano-paste of this example is very similar to the previous example in terms of processing, 3D printing, and molding. The plate was printed with toluene in the paste; the toluene was then removed after the 3D printing. The plate was cured at 190-200° C. and then pyrolyzed at 600° C. FIG. 8B is a photograph of the plate after such pyrolysis. The total weight after evaporation of Surf-240 and toluene was 22+25+65=112 g. Therefore, the percentage of micro- and nano-sized particles overall was: 90/112=80%. Such a part with 80% micro- and nano-particles of SiC preferably converges to minimum porosity and maximum density much faster using polymer infiltration and pyrolysis (PIP), and hence needs fewer PIP iterations as compared to the previous example (or lower percentage nano-pastes). This is an economically attractive approach since it reduces the "product development cycles time," which reduces costs in all areas of labor, capital equipment and associated parts, pre-ceramic polymer, and the argon gas. The final goal dimensions were 90 mm square with 8 mm in thickness. SAPI plates with the initial dimensions of 93 mm square with 9 mm thickness to allow for shrinkage were produced prior to employing nano-polymer infiltration and pyrolysis (i.e. PIP in which the polymer comprises nano-particles) techniques described herein.

Example 7—SAPI Plate 3

A SAPI plate was made from the following composition:

TABLE 6

| Material | Weight (g) |
|---|---|
| SMP-10 | 10 |
| Toluene | 10 |
| Surf-240 | 30 |
| 45-55 nm SiC Nanoparticles | 25 |
| 1-5 micron SiC Microparticles | 65 |

Figure 8C:
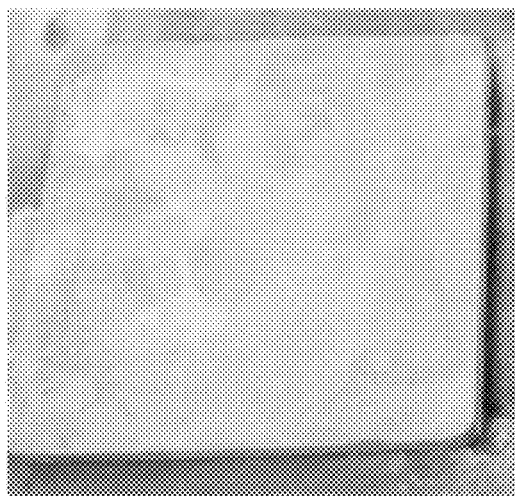

In this example discontinuous fibers were used to enhance the processing and properties. Even with the toluene, the nano-paste was rather thick and most likely was not 3D printable/extrudable. Therefore the Surf-240 was removed, the part was molded, and the toluene subsequently removed before curing and pyrolysis. For molded parts, the toluene may alternatively be removed prior to molding. The vacuum processes for removing Surf-240 and toluene are the same as those described above. The plate was cured at 190-200° C. and then pyrolyzed at 600° C. FIG. 8C is a photograph of the plate after such pyrolysis. The total weight after evaporation of Surf-240 and toluene was 10+25+65=100 g. Therefore, the percentage of micro- and nano-sized particles overall is: 90/100=90%. The final goal dimensions were 90 mm square with 8 mm in thickness. SAPI plates with the initial dimensions of 93 mm square with 9 mm thickness were produced to allow for shrinkage prior to employing nano-polymer infiltration and pyrolysis techniques. Such a paste comprising 90% particles should yield parts with minimum porosity and maximum density with good quality. It is also expected that plates made in accordance with this example will have little to no shrinkage, since the nano-paste comprises more solid materials (i.e., micro/nanoparticles) and less SMP-10 when compared with the prior two examples. This is also an economically attractive approach since the paste comprises the majority of the solid materials to begin with. One can use chopped or discontinuous fibers to hold the parts upon curing and pyrolysis for enhanced processing properties. The pyrolysis temperature will determine the type and quality of fabric that can be used.

Example 8: Processing of Ceramic "Nano-Paste" and its Curing and Nano-Polymer Infiltration and Pyrolysis (PIP)

In view of the above results, Surf-240 should preferably be used during mixing process to lower viscosity and reduce mixing time. It is preferably removed just after the mixing and before molding/extruding (3D printing) and curing/pyrolysis, since it can cause cracking during these steps due to its high vapor pressure. Toluene reduces the viscosity greatly and increases working time since its low vapor pressure prevents the mixture from drying out quickly. Toluene still causes cracks post curing/pyrolysis due to volume reduction, particularly in thick parts. The minimum amount of toluene should be used during extrusion or molding forming (3D printing) and subsequently removed in a vacuum furnace, to expedite the evaporation process, before the curing/pyrolysis steps. Alternatively, if a 3D printer (or an extruder) with sufficiently higher nozzle pressure or just a larger nozzle is available, then for some mixtures the toluene can be removed from the nano-paste and it will still be suitable for 3D printing. Increasing the amount of SMP-10 improves workability during extrusion (i.e. 3D printing) or molding. Working can advantageously be performed indefinitely if the process is performed in an inert environment, which can prevent cracking during extrusion for large parts that require long printing time. Increasing the operation/printing temperature reduces the mixture viscosity. A higher SMP-10 percentage also improves post pyrolysis surface finish, but increases volume reduction. The nano-paste can be molded using conventional methods as well as using compaction and pressing techniques in the molds to produce increased densities.

A higher particle content reduces volume changes and cracking, but reduces workability. Example 1 comprises about 72% (or up to 80%) of micro- and nano-sized SiC particles, but it has toluene during 3D printing. Example 2 comprises about 64% of micro- and nano-sized SiC particles but it does not have toluene during the 3D printing. Example 3 comprises about 90% particles, and it too has toluene during the molding. In Examples 1 and 3 toluene should be removed (as explained earlier) after extruding, 3D printing, and molding, and before curing and pyrolysis.

Figure 9:
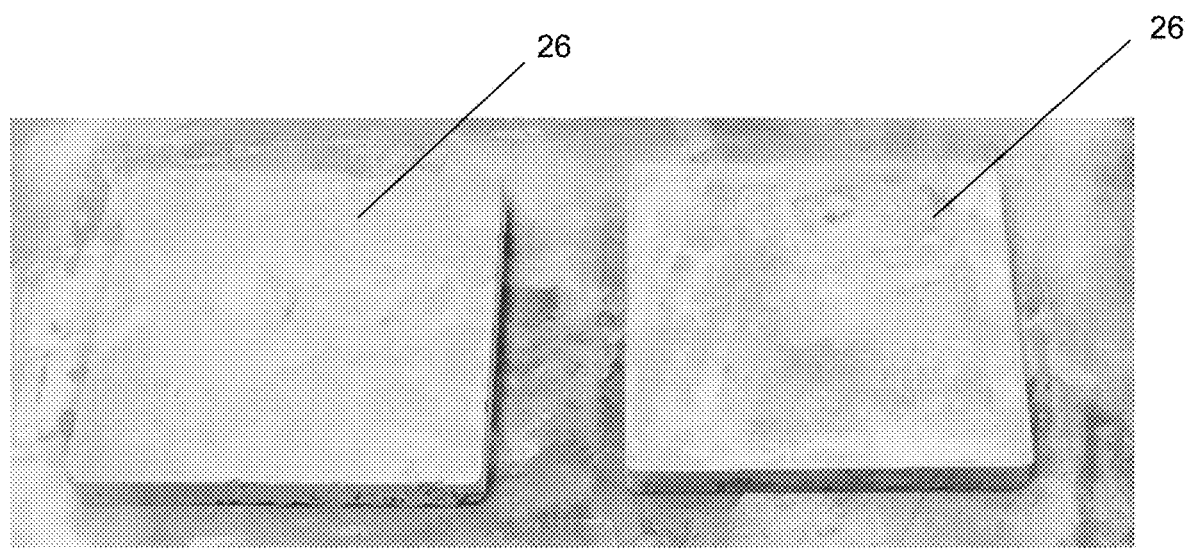
FIG. 9 shows two example SAPI plates of the present invention after curing.

In order to fill in voids in the cured part, in the examples above polymer infiltration and pyrolysis (PIP) steps were performed. Initial pyrolysis was preferably performed at about 600 degrees C. to minimize the shrinkage and cracking so that the part will hold its geometric integrity, and then the subsequent polymer infiltration and pyrolysis steps were performed at 1000 degrees C. For the previous examples, polymer infiltration and pyrolysis Technique A, described below in Example 9, was used (although other plates using Technique B were also manufactured). Approximately 5 wt % of 15 nm SiC nanoparticles and approximately 1-2% Surf-240 were mixed with SMP-10, and the mixture was bath sonicated for about one hour. The parts were then vacuum infiltrated with the nano preceramic polymer followed by curing at 200° C., and subsequent pyrolyzation at 1,000° C. under an inert (e.g argon gas) environment. FIG. 9 shows typical SAPI plates 26 after the first curing at 200° C. This iteration was continued until approximately a 1% weight gain was achieved, at which time a last iteration was performed with 15% 45-55 nm spec (nominally 50 nm average) SiC nanoparticles with 2% to 4% Surf 240 mixed into SMP-10 (again using a bath sonicator for about 60 minutes). This final nano-polymer infiltration and pyrolysis step preferably achieves less than about 1%, and preferably less than about 0.5%, weight gain convergence and produces a good quality surface finish. As described above, the initial nano-polymer infiltration and pyrolysis iterations preferably use a smaller percentage of nanoparticles to prevent premature closure of the internal pores and cracks, while the final iteration is done at higher percentage to close the surface pores to achieve good quality surface finish. Pure SMP-10 is preferably used if the pore diameter becomes close to nanoparticle size. Other than the first pyrolysis step, that is preferably performed at about 600 degrees C. to minimize shrinkage and cracks, the following pyrolysis steps are preferably performed at about 1000 degrees C., and the final pyrolysis step is preferably performed at about 1,400-1,500° C., thus producing a crystalline beta-phase SiC matrix for this new class of ceramic matrix nanocomposites. The parts may optionally be subsequently heated to higher temperatures of 1900-2100 degrees C. in an inert atmosphere (e.g. argon gas) to convert the SiC beta-phase to SiC alpha-phase, if desired.

Results

Figure 10A:
FIGS. 10A and 10B are two photographs showing comparisons of shrinkage of the plates of FIGS. 8A-8C after polymer infiltration and pyrolysis.
Figure 10B:
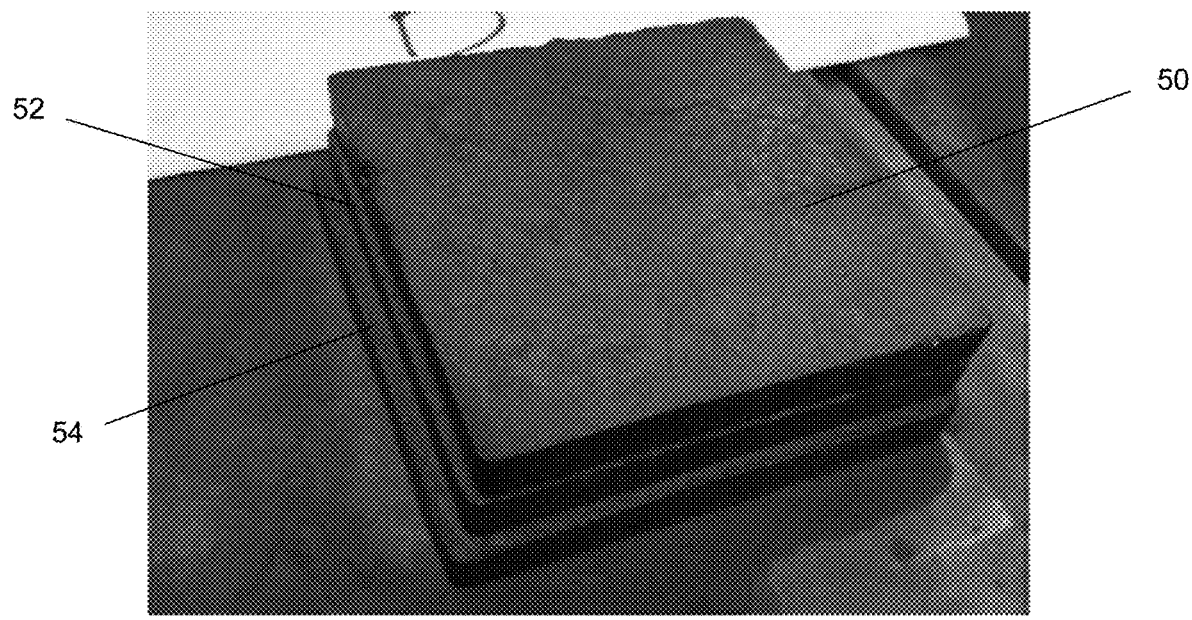

The final forms of the SAPI plates manufactured from nano-pastes having 70% particles (Example 5) 80% particles (Example 6), and 90% particles (Example 7) after curing at 200° C. and employing the nano-polymer infiltration and pyrolysis technique after the final PIP iteration and pyrolysis at 1,000° C., were compared for the amount of the shrinkage. Comparison photographs are shown in FIGS. 10A and 10B. 90% nano-paste plate 54 had little to no shrinkage, 70% nano-paste plate 50 had the highest amount of the shrinkage, and the shrinkage of 80% nano-paste plate 52 was between the two. All plates started at the dimensions of 93 mm×93 mm×9 mm (i.e., the mold dimensions). The final dimensions of the SAPI plates were as follows:

70% nano-paste plate 50: 89.58 mm×88.82×8.67 (i.e., about 4.1% shrinkage in length and 3.7% in thickness).

80% nano-paste plate 52: 89.85 mm×90.20×8.77 (i.e., about 3.2% shrinkage in length and 2.6% in thickness).

90% nano-paste plate 54: 93.32 mm×92.74×8.91 (i.e., about 0.0% shrinkage in length and 1.0% in thickness).

Therefore, as the percentage of micro/nanomaterials in the nano-paste increases, the percentage of the shrinkage decreases.

Example 9

Figure 11:
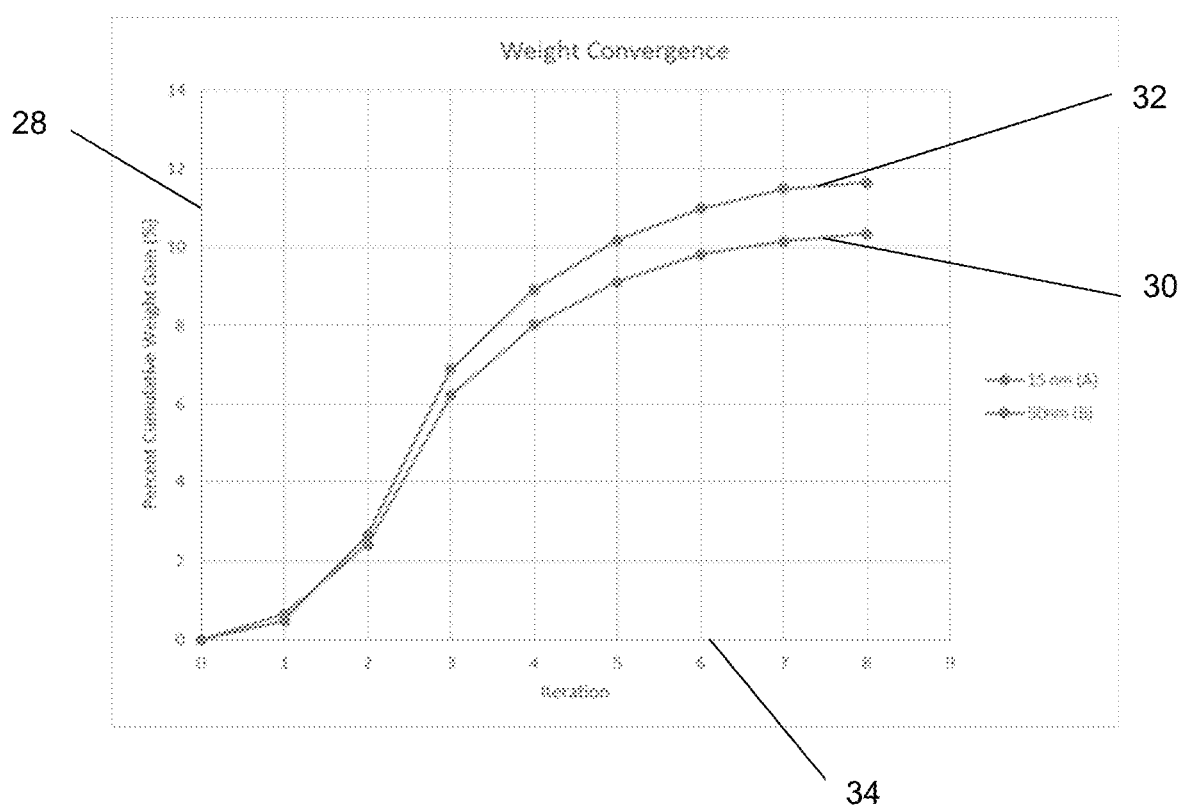
FIG. 11 is a graph showing the average percent cumulative weight gain after each PIP cycle for 70%, 80%, and 90% plates manufactured using Techniques A and B.

In this example, two nano-polymer infiltration and pyrolysis techniques were compared. Technique A 30 used 5% of 15 nm nanoparticles first and then 15% of 45-55 nm spec (nominally 50 nm average) nanoparticles for the last iteration. Technique B 32 used 5% of 45-55 nm spec (nominally 50 nm average) nanoparticles first and then 15% of 15 nm nanoparticles for the last iteration. The following table (plotted in FIG. 11) gives the percent cumulative weight gain 28 after each cycle 34 averaged over the three plates of 70%, 80%, and 90%.

TABLE 7

| | Average percent cumulative weight gain | | | | | | | | |
|---|---|---|---|---|---|---|---|---|---|
| Iteration | 0 | 1 | 2 | 3 | 4 | 5 | 6 | 7 | 8 |
| 15 nm (A) | 0 | 0.642288 | 2.409817 | 6.206 | 8.022336 | 9.117213 | 9.82143 | 10.15583 | 10.3456 |
| 50 nm (B) | 0 | 0.473473 | 2.654841 | 6.881814 | 8.930038 | 10.18485 | 10.98741 | 11.4893 | 11.65452 |

Figure 12:
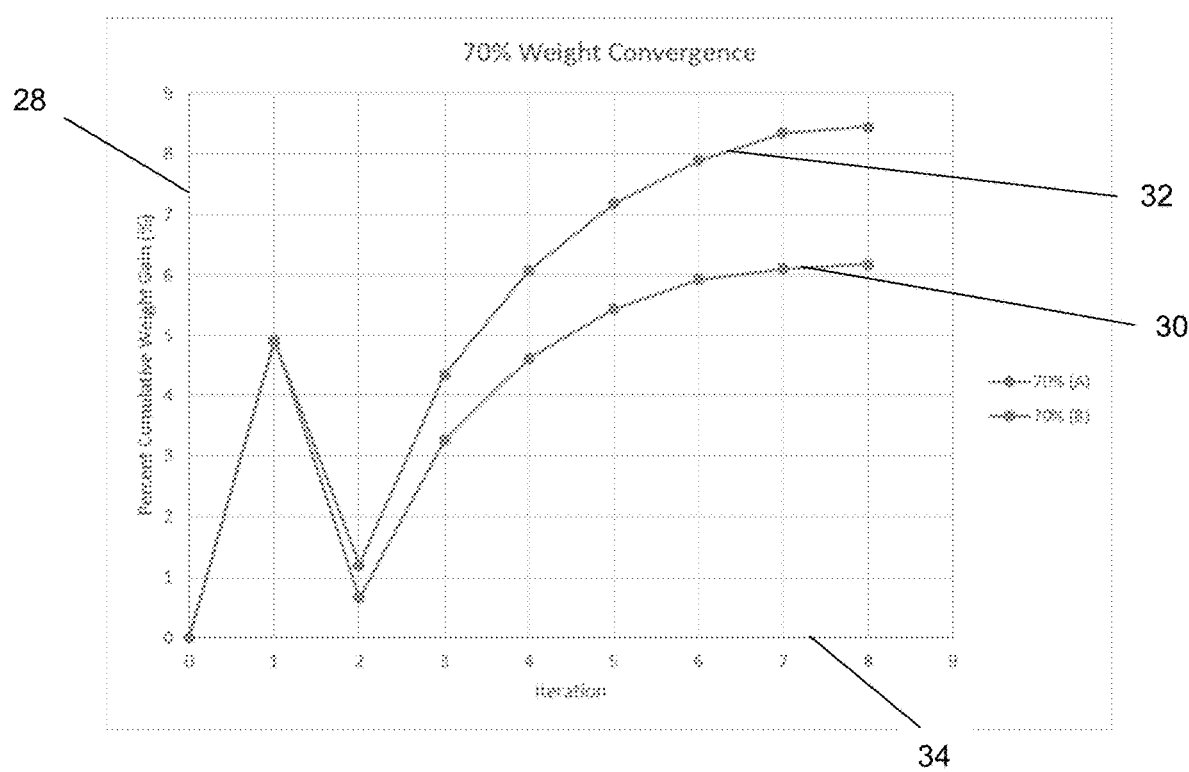
FIG. 12 is a graph showing the percent cumulative weight gain after each cycle for 70% plates manufactured using Techniques A and B.
Figure 13:
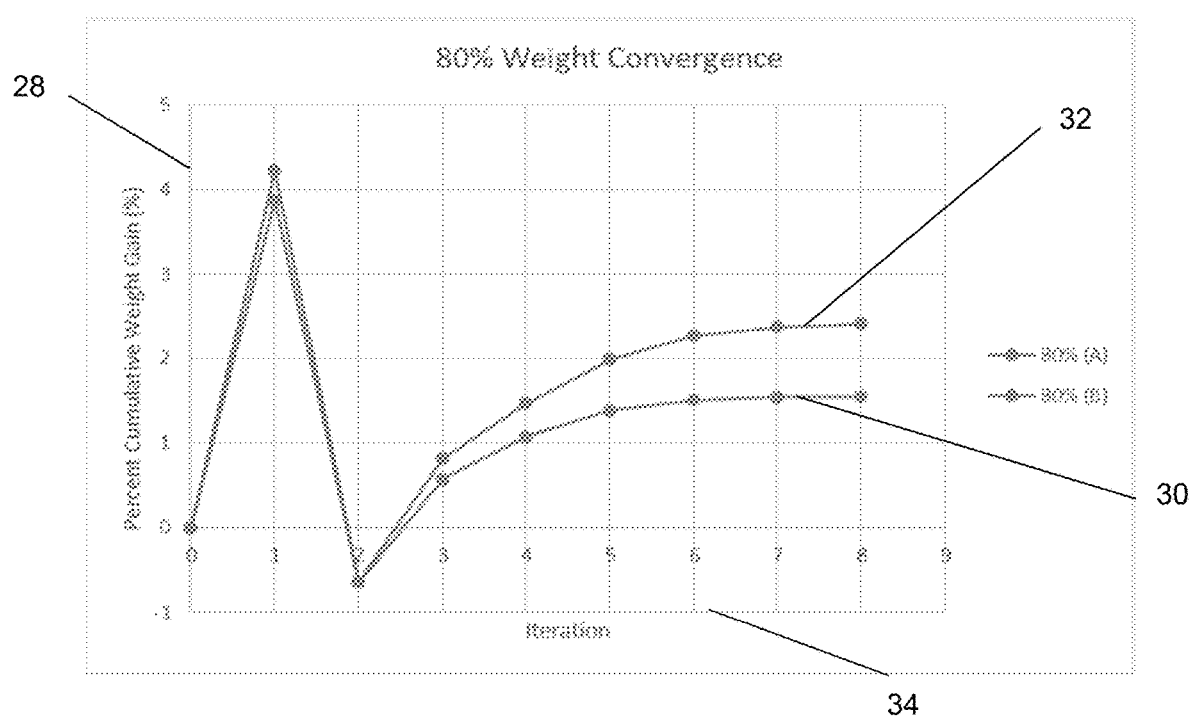
FIG. 13 is a graph showing the percent cumulative weight gain after each cycle for 80% plates manufactured using Techniques A and B.
Figure 14:
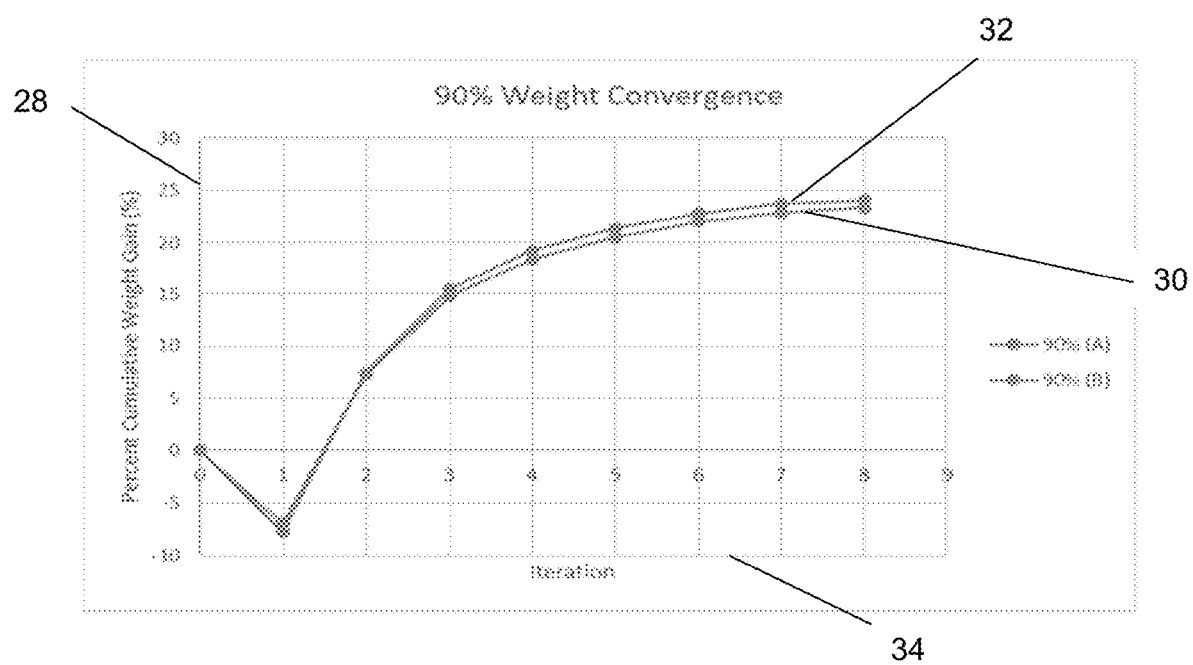
FIG. 14 is a graph showing the percent cumulative weight gain after each cycle for 90% plates manufactured using Techniques A and B.
Figure 15:
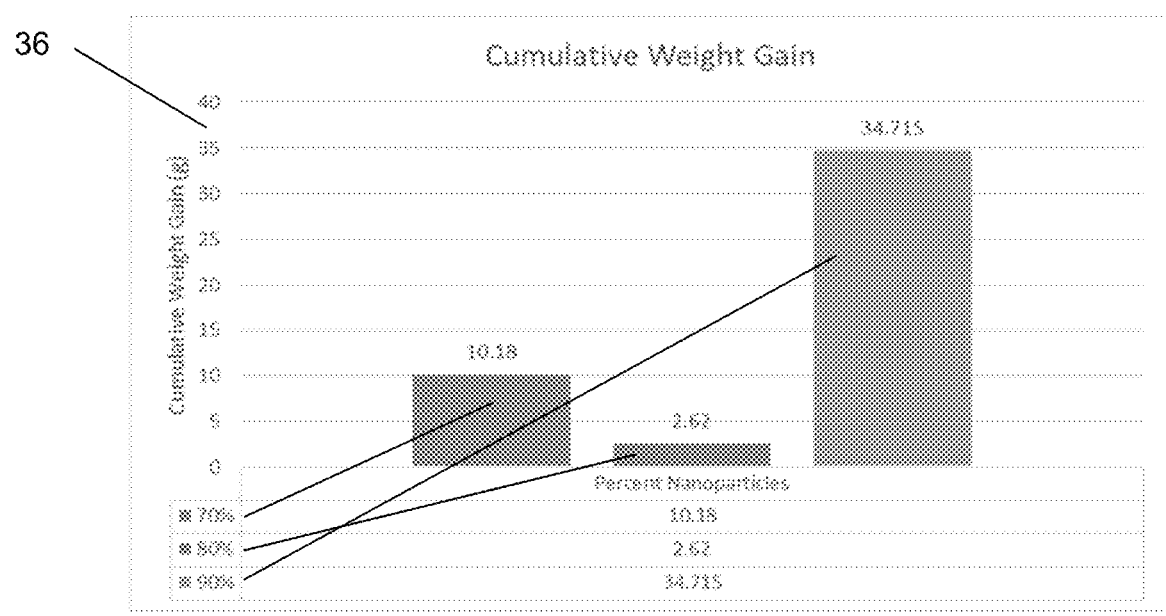
FIG. 15 is a chart showing the average cumulative weight gain for 70%, 80%, and 90% plates manufactured using Techniques A and B.

FIG. 12 shows the percent cumulative weight gain 28 after each cycle 34 for the 70% nano-paste plate employing Technique A 30 and Technique B 32. FIG. 13 shows the percent cumulative weight gain 28 after each cycle 34 for the 80% nano-paste plate employing Technique A 30 and Technique B 32. FIG. 14 shows the percent cumulative weight gain 28 after each cycle for the 90% nano-paste plate employing Technique A 30 and Technique B 32. FIG. 15 shows the average total cumulative weight gain 36 for 70%, 80%, and 90% nano-paste plates using both techniques.

As shown in the results, the weight gain for Technique A was higher for the 70% and 80% plates, which suggests that the shrinkage for Technique B was lower (which is attributed to larger size nanoparticles). However, the results from Techniques A and B were similar to the 90% results. In the nano-polymer infiltration and pyrolysis techniques, the 80% SAPI plates nearly converged in about 6 nano-polymer infiltration and pyrolysis iterations (see FIG. 13). The 90% SAPI plates converged in about 7 nano-polymer infiltration and pyrolysis iterations (see FIG. 14). The 70% SAPI plates converged in about 8 nano-polymer infiltration and pyrolysis iterations (see FIG. 12).

FIG. 15 shows that the average cumulative weight gain 36 for 70%, 80%, and 90% nano-paste SAPI plates were 10.18, 2.62, and 34.72 grams, respectively, employing nano-polymer infiltration and pyrolysis techniques A and B. It also shows that the 80% nano-paste plate appeared to have an optimum saturation of SMP-10 and amount of nanoparticles, and hence its weight gain is an absolute minimum (i.e., 2.62 grams over 8 iterations), while the 90% nano-paste plate appeared to have a starvation of SMP-10 with its nanoparticles and its weight gain relatively large (i.e., 34.72 grams over 8 iterations). True optimum range for 3D printing has a range between 75-85%.

General Conclusions and Manufacturing Guidelines Based on the Examples to Produce High Quality Parts Surf-240

Surf-240 is preferably used during the mixing process to lower viscosity and reduce mixing time. It is preferably removed just after the mixing and before molding/extruding (3D printing) and curing/pyrolysis, since it can cause cracking during molding/extrusion (3D printing) and curing due to its high vapor pressure. Other surfactants may be used instead of or in addition to Surf-240.

Toluene

Toluene reduces the viscosity and increases working time since its low vapor pressure prevents the mixture from drying out quickly. Toluene causes cracks post curing/pyrolysis due to volume reduction. The minimum amount is preferably used during extrusion or molding forming (3D printing) and then removed in a vacuum furnace, to expedite the evaporation process, after the molding/extruding (3D printing) and before the curing/pyrolysis. Alternatively, a heated extruder nozzle, a heated print bed, or a heated print enclosure can remove the toluene as it prints. If toluene is used, its amount should be minimized. Toluene can be replaced with other surfactants/solvents compatible with the preceramic polymer used.

SMP-10

Increasing the relative amount of SMP-10 improves workability during molding or extrusion (3D printing). With the appropriate amount of ceramic precursor the working time can be extended as long as needed to finish depositing or molding the part without drying or decomposition of the nano-paste if the process is performed in an inert environment. This can prevent cracking during extrusion for large parts that require long printing time. Increasing the operation/printing temperature reduces the mixture viscosity. A higher SMP-10 percentage also improves post pyrolysis surface finish, but increases volume reduction, increases polymer infiltration and pyrolysis cycles, decreases density, and relatively reduces the micro- and nano-particles percentage in the mix. Using too much SMP-10 may cause bubbling and large voids to form on or in the part. Excess SMP-10 may be mechanically removed, such as with a liquid solid separator at the printing nozzle, using increased working pressure for a 3D printer, or cold pressing the paste before curing in case of molding, to densify the part and reduce SMP-10. Preceramic polymers other than SMP-10, or a hybrid of various preceramic polymers, may be used, but optimum 3D printing/extruding mixtures, molding mixtures, and/or working or pressing pressures should be adjusted depending on the viscosity of the paste.

Particles

Higher SiC particle content reduces volume changes and cracking, polymer infiltration and pyrolysis completion cycles to reach density/weight-gain convergence, but also can have the disadvantage of reducing nano-paste workability, depending on the processing preferences as well as properties/performance relationship desired. Higher proportions of micro/nano-particles (or microparticles only) or larger particles reduce the amount of preceramic polymer needed for optimum saturation and 3D printing/extruding or molding. Higher proportions of nano-particles (or other nanomaterials such as carbon nanotubes or graphene nanosheets) or smaller particles have the opposite trend, i.e., a higher amount of preceramic polymer is needed compared to when micro-particles are used, due to the higher surface areas of nanomaterials requiring higher matrix for coverage and surface wet-out. Therefore, increased concentration of nano-particles/materials requires increased working pressure for 3D printing or press pressure for molding to achieve optimum part densities and reduce the part shrinkage to avoid the cracks to develop within the parts. Other ceramic or oxide particles or nanomaterials, or mixtures thereof, of any size or sizes, can also be used.

Chopped or Discontinuous Fibers

Chopped or discontinuous fibers can be added to the nano-paste to enhance mechanical, thermal, and/or electrical properties (dependent on fiber type, fiber volume fraction, and length used). The fibers decrease shrinkage and cracks during printing/extruding, molding, curing, and pyrolyzing. They can also prevent cracks from forming due to surfactant and/or solvent remaining in the part. Fibers are preferably compatible with the pyrolysis temperature, e.g., carbon fiber can be used with a maximum pyrolysis temperature of 800-1000° C. under an inert environment. Coatings can be used on the fibers to alter the fiber/matrix interface. The use of fibers will also reduce cracking on complex parts or when pressureless 3D printing or molding are used with no compaction, followed by curing and pyrolysis.

Curing and Polymer Infiltration and Pyrolysis

Curing and pyrolysis should be done after the surfactants/solvents are removed from the nano-paste, to minimize cracking/shrinkage. Higher density parts increase mechanical, electrical, and thermal properties by decreasing voids and pores sizes. This can be achieved by using higher pressure at the nozzle for 3D printing/extruding or press pressure the paste for its compaction into the mold for molding. This should be done for formation of parts during 3D printing or molding, after the curing, and at least after the first pyrolysis when possible. Higher densities can also be achieved by optimizing the micro/nano-particle proportion and/or mixture percentages. Parts that have a higher initial density (i.e. close to maximum possible) usually result in a reduction of polymer infiltration and pyrolysis cycles required for densification, and in some cases require only one pyrolysis cycle after the initial one. Matrix slurries with low percentages of nanoparticles can be used during re-infiltration and could increase final part density and/or reduce pyrolysis cycles. The preceramic polymer with no nanoparticles should be used if the average pore size of the part is close to the size of the nanoparticles in the slurry (this is to prevent premature pore closure). Higher concentrations of nanoparticle slurry can be used during final pyrolysis cycles to reduce surface imperfections and/or close surface pores. Large surface imperfections can be repaired during any polymer infiltration and pyrolysis cycle by skimming a layer of the original paste used over the impacted area, with little to no effect on part properties. Parts that are 3D printed can also have a layer of original paste skimmed over its surface if a flat surface is desired, and/or could increase part mechanical properties by reducing stress concentrations due to surface imperfections.

Shrinkage 1

The average shrinkage in length and thickness is approximately 3%.

Shrinkage 2

As the percentage of solid particles in the nano-paste increases, the percentage of the shrinkage decreases. Larger particle sizes reduce shrinkage, while smaller particles lead to an increase in shrinkage. This is due to the increased amount of preceramic polymer required for larger surface-to-volume ratios of smaller size particles. SMP-10 reduces in volume and increases in density during polymer infiltration and pyrolysis, which increases part shrinkage with larger percentages of SMP-10 used. Using compaction methods such as increased pressures used during forming (i.e., 3D printing and/or molding), curing, and pyrolysis reduces shrinkage, especially for parts with higher proportions of smaller nano-particles and/or nanomaterials.

Shrinkage 3

In comparison, nano-polymer infiltration and pyrolysis Technique B leads to less shrinkage, which is attributed to larger size nanoparticles (i.e., 45-55 nm) used in the nano-polymer infiltration and pyrolysis Techniques B as opposed to the smaller size nanoparticles (i.e., 15 nm) used in the nano-polymer infiltration and pyrolysis Technique A.

Shrinkage 4

When 90% nano-paste with nano-polymer infiltration and pyrolysis Technique B are combined, the shrinkage is 0% for practical purposes.

Quality—Curing and Molding with Kapton

When the nano-paste shrinks in the mold during the first curing step, the SMP-10 adheres to the walls of the mold, and when shrunk, it creates cracks on the side walls of the SAPI plates, especially for the articles manufactured using nano-pastes with particle percentages of less than 90%. To avoid these manufacturing flaws, the walls of the mold are preferably covered by Kapton tape, in addition to the application of a mold release compound.

Quality—Pyrolysis and Caul Plate

When nano-pastes shrink in the high-temperature furnace during pyrolysis, they may bow (albeit less than a millimeter). Therefore, thick caul plates should be placed on the SAPI plates (or other parts) to prevent this bowing/curvature.

Weight Gain

The 80%+/−5% nano-paste has the optimum saturation of SMP-10 and amount of nanoparticle, and hence its weight gain is an absolute minimum (i.e., 2.62 grams over the entire 8 iterations), while the 90% nano-paste appears to have a starvation of SMP-10 with its nanoparticles and its weight gain is relatively very large (i.e., 34.72 grams over 8 iterations), and that for the 70% is between with a weight gain of 10.18 grams.

Using Paste as an Adhesive

Variations of the paste can also be used to glue multiple parts together that have been cured at least once to produce large, fully densified parts. The parts must be cured after the paste is applied as the adhesive, and then polymer infiltration and pyrolysis is performed as described above to increase successful adhesion. Using the nano-paste that the parts are made of is preferred, but mixing more preceramic polymer into the paste can thin it out to fill smaller gaps and/or improve ease of application. In some cases the preceramic polymer without any nanoparticles can be used as the adhesive. Applying pressure to the adhesive areas during curing and pyrolysis preferably increases the chance of success. This process can also be used to glue cracked parts together with practically no alteration in the part properties.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A method for manufacturing a ceramic composite part, the method comprising:
   providing a mixture comprising at least one preceramic polymer and first particles, the mixture comprising a paste or clay;
   printing or molding the mixture to form an article in a shape of the ceramic composite part, the mixture comprising a viscosity such that it is capable of holding a freestanding shape as it is being printed or molded without the support of a form;
   infiltrating the article with the preceramic polymer; and
   pyrolyzing the article at a first temperature to form the ceramic composite part.

2. The method of claim 1 wherein the preceramic polymer is a precursor to silicon carbide, boron carbide, boron suboxide, alumina, silicon nitride, or boron nitride.

3. The method of claim 1 wherein the ceramic composite part comprises armor, a helmet, a protective plate, or a portion thereof.

4. The method of claim 1 wherein the mixture comprises a first organic compound, and the method further comprises removing the first organic compound prior to the printing or molding step.

5. The method of claim 4 wherein removing the organic compound comprises processing the mixture in a vacuum chamber.

6. The method of claim 1 wherein printing or molding the mixture comprises placing a sacrificial material in the printed or molded mixture.

7. The method of claim 6 comprising removing the sacrificial material.

8. The method of claim 7 wherein the ceramic composite part comprises internal voids or channels after the removing step.

9. The method of claim 1 wherein the first particles comprise between approximately 70 wt % and approximately 90 wt % of the mixture.

10. The method of claim 1 wherein printing or molding the mixture comprises applying pressure and/or compaction to the mixture.

11. The method of claim 1 comprising curing the mixture.

12. The method of claim 11 wherein a difference between a size of the ceramic composite part after the pyrolysis step and a size of the part prior to curing is less than approximately 5%.

13. The method of claim 12 wherein a size of the ceramic composite part after the pyrolysis step is the same as a size of the part prior to curing.

14. The method of claim 11 wherein curing the mixture comprises microwaving the mixture.

15. The method of claim 11 wherein the curing step is partially or completely performed during the printing or molding step.

16. The method of claim 1 wherein the pyrolyzing step comprises microwaving the article.

17. The method of claim 1 wherein the first particles comprise a mixture of microparticles and nanoparticles.

18. The method of claim 17 wherein the microparticles are between approximately 1 micron and approximately 1000 microns in size.

19. The method of claim 18 wherein the microparticles are between approximately 1 micron and approximately 5 microns in size.

20. The method of claim 17 wherein the nanoparticles are between approximately 10 nm and approximately 1000 nm in size.

21. The method of claim 20 wherein the nanoparticles are between approximately 45 nm and approximately 55 nm in size.

22. The method of claim 4 wherein the mixture comprises a second organic compound, and wherein the first organic compound and a second organic compound are liquids with different vapor pressures.

23. The method of claim 22 wherein the first organic compound comprises a surfactant and the second organic compound comprises a solvent.

24. The method of claim 23 wherein the surfactant comprises a non-ionic polyether modified trisiloxane and the solvent comprises toluene.

25. The method of claim 1 wherein in the infiltrating step the preceramic polymer comprises an organic compound.

26. The method of claim 1 further comprising disposing a layer of the mixture on a surface of the article prior to the infiltrating step.

27. The method of claim 1 wherein molding the mixture comprises coating one or more walls of a mold with a polyimide film prior to disposing the mixture in the mold.

28. The method of claim 1 wherein the pyrolyzing step comprises placing one or more caul plates on the article to prevent bowing.

29. The method of claim 1 wherein the first particles comprise silicon carbide, boron carbide, boron suboxide, alumina, silicon nitride, boron nitride, or a combination thereof.

30. The method of claim 1 wherein in the infiltrating step the preceramic polymer comprises a first weight percentage of second particles.

31. The method of claim 30 comprising:
   infiltrating the ceramic composite part with the preceramic polymer comprising a second weight percentage of the second particles after the pyrolyzing step; and
   pyrolyzing the ceramic composite part at a second temperature.

32. The method of claim 31 wherein the second temperature is the same or higher than the first temperature.

33. The method of claim 31 wherein the second weight percentage of second particles is the same, higher or lower than the first weight percentage of second particles.

34. A method of joining two ceramic composite parts together, each CMC part manufactured by the method of claim 1, the method comprising:
   applying a material to a first surface of a first ceramic composite part; and
   joining a second surface of a second ceramic composite part to the first surface.

35. The method of claim 34 wherein the material is selected from the group consisting of the mixture, the preceramic polymer, and the preceramic polymer comprising a lesser weight percent of particles than a weight percent of first particles in the mixture.

36. The method of claim 34 comprising applying the material to the second surface prior to the joining step.

37. The method of claim 34 comprising curing the material.

38. The method of claim 34 further comprising pyrolyzing the material and the joined ceramic composite parts.

39. The method of claim 30 wherein the second particles are the same as the first particles.

40. The method of claim 30 wherein the second particles comprise silicon carbide, boron carbide, boron suboxide, alumina, silicon nitride, boron nitride, or a combination thereof.

\* \* \* \* \*